United States Patent [19]

Neumann et al.

[11] 3,808,777

[45] May 7, 1974

[54] OVERHEAD AIR FILTER

[75] Inventors: Gerhard Max Neumann; Hans-Joachim Wittemeier, both of Berlin, Germany

[73] Assignee: Delbag-Luftfilter Gesellschaft mit beschrankter Haftung, Berlin, Germany; by said Neumann

[22] Filed: Nov. 14, 1972

[21] Appl. No.: 306,312

Related U.S. Application Data

[62] Division of Ser. No. 31,674, April 24, 1970, Pat. No. 3,760,568.

[30] Foreign Application Priority Data

Apr. 29, 1969 Germany............................ 1922268

[52] U.S. Cl..................... 35/473, 55/484, 55/502, 55/507, 98/40 D
[51] Int. Cl........................................... B01d 31/00
[58] Field of Search............ 55/473, 484, 502, 507; 98/40 D

[56] References Cited
UNITED STATES PATENTS
3,553,941   1/1971   Wittemeier et al................. 55/473

*Primary Examiner*—Bernard Nozick
*Attorney, Agent, or Firm*—Karl F. Ross; Herbert Dubno

[57] ABSTRACT

Incoming filtered air is discharged as a uniform downcurrent into a room from an array of horizontal filter units of generally pyramidal shape with a filter cell across the larger end, these units being either fitted individually into or out aperatures in a false ceiling by connecting pieces at their apex, or connected side-by-side as a common duct by connecting pieces on their sloping sides.

5 Claims, 9 Drawing Figures

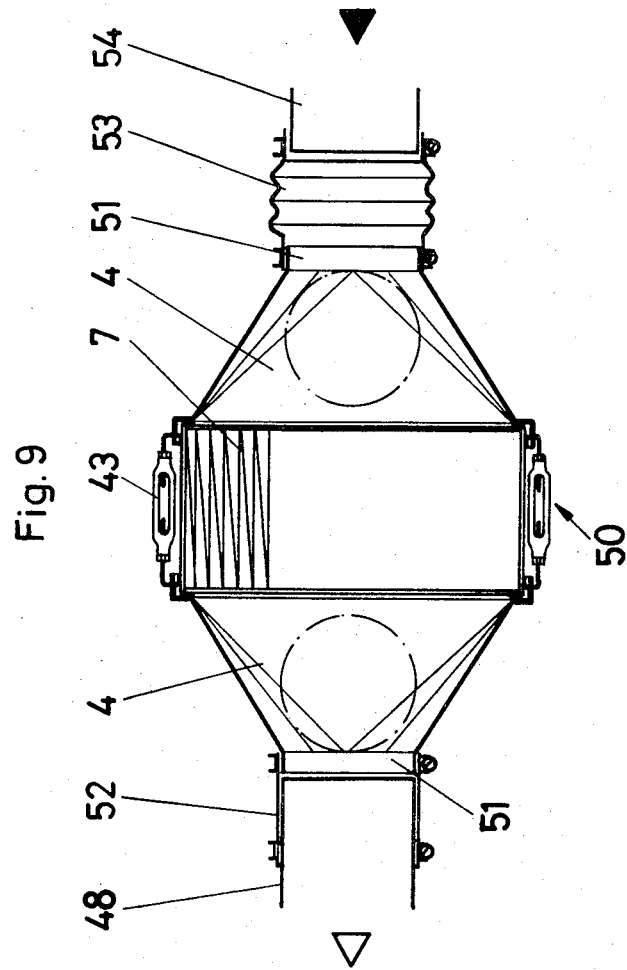

OVERHEAD AIR FILTER

This is a division of application Ser. No. 31,674, filed Apr. 24, 1970.

FIELD OF THE INVENTION

This invention relates to filters for separation of suspended material from air or other gas, preferably for ventilation of a room to be kept clean.

BACKGROUND OF THE INVENTION

An earlier commonly assigned and co-pending application Ser. No. 796,832 filed by Hans-Joachim Wittemeier and myself on Feb. 5, 1969 (now U.S. Pat. No. 3,553,941 of Jan. 12, 1971) describes an array of filters wherein a transverse or descending air flow is provided. The present invention relates also to the problem of providing such a descending flow with the aid of a array of overhead filter units, and particularly aims at facilitating the removal of all or part of any filter unit for purposes of replacement.

SUMMARY OF THE INVENTION

In accordance with our present invention, each filter unit comprises a filter cell at the broader lower end of a downwardly diverging housing whose narrower upper end is provided with a pair of laterally extending ports connected to similar ports of adjacent housings so as to form a continuous horizontal manifold therewith; in the last unit at one end of the array, one of the ports is omitted. At the opposite end of the array, air to be filtered is introduced into the manifold by way of inlet means advantageously comprising a pair of oppositely tapering housings in series, with a further filter cell interposed between their confronting broader ends. The filter cells are held in position with the aid of perforated bottom plates underlying the several units, the plates being suspended from the associated housings by springs serving to clamp each filter cell in place between its housing and its bottom plate.

The confronting ends of the oppositely tapering housings in the inlet may be interconnected by links whose release enables the two housings to be moved apart with compression of a bellows in series therewith, this separating movement facilitating the extraction of the interposed input filter.

According to another feature of our invention, the interconnected ports of adjacent housings are provided with couplings which include a frustoconical insert at one port entering the adjoining port and pointing away from the inlet to the manifold, thus tapering in the direction of air flow.

In the first type which is suitable to be held with the connecting piece against the aperture in the horizontal surface, the connecting piece is stepped outwards to define an annular collar and the sealing member consists of a ring of resilient material within the collar. This type is to be held within a downwardly extending short sleeve surrounding the aperture and of the same diameter as the sealing ring, and further comprises a clamping plate extending around the connecting piece beneath the outward step defining the collar, and means to urge the clamping plate towards the horizontal surface to clamp the sealing ring within the collar by the lowest edge of the sleeve.

For example, ring nuts threaded in the plate and fixed to the horizontal surface can be used.

The second, third and fourth types are all suitable to be held with the connecting piece within an aperture in a horizontal surface.

In the second type, the connecting piece is of slightly increased diameter at its outer end and the sealing member consists of a deformable sleeve surrounding the connecting piece. This type is to be used with an upwardly extending sleeve around and above the aperture, which sleeve is shorter than the connecting piece and lies within the deformable sleeve, and two annular clamping clips, the first for clamping the deformable sleeve against the connecting piece beneath the increased diameter portion and the second for clamping the deformable sleeve against the upwardly extending sleeve.

BRIEF DESCRIPTION OF THE DRAWING

The invention will be further described with reference to the accompanying drawing wherein:

FIG. 9 shows an initial filter useful with the embodiment of FIG. 8.

SPECIFIC DESCRIPTION

Figure 1:
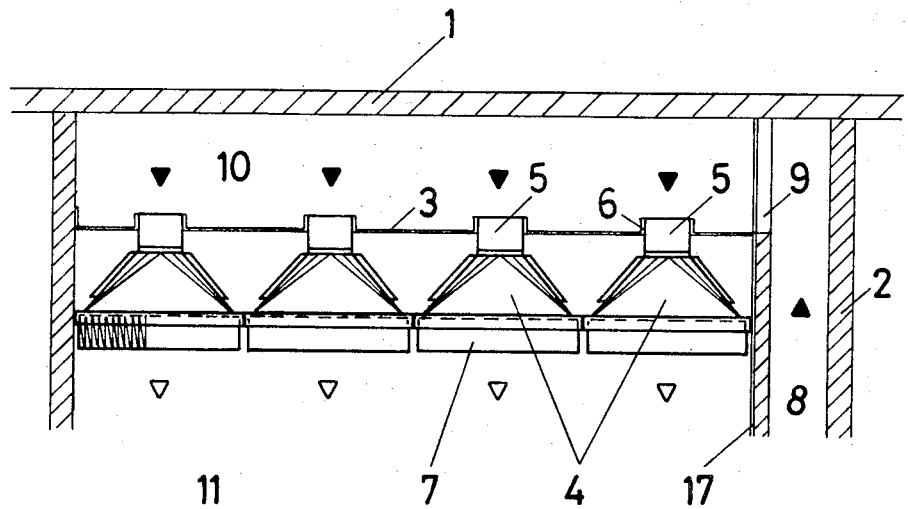
FIG. 1 shows a diagram of a filter array formed in a ceiling by a plurality of housings equipped with filter cells.

As shown in FIG. 1, an intermediate or false ceiling 3 is suspended below the original ceiling 1 of a work room with sidewalls 2. At this intermediate or false ceiling 3 are situated four housings 4 in each of which there is sealingly installed a filter cell 7. In the top of the housing 4 opposite the filter cell 7 there is situated a connecting piece or sleeve 5 which is sealingly received in a perforation 6 of the false ceiling 3. The air which is to be treated is passed by a duct 8 through an opening 9 into a plenum chamber 1 10 above the false ceiling 3; it then flows through the open connecting pieces 5 into the housings 4 and, after passing through the filter cells 7, into the work room 11 which is to be ventilated.

Figure 2:
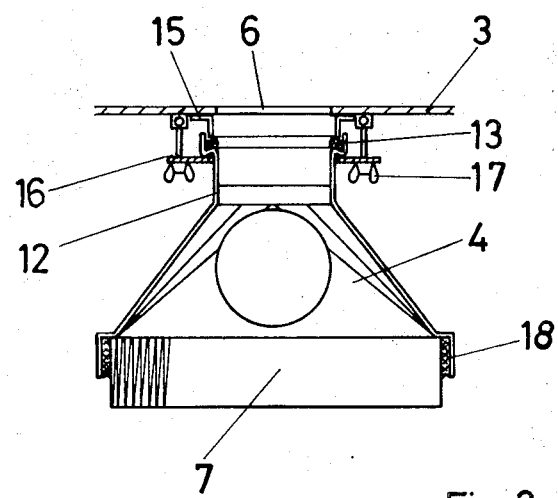
FIG. 2 shows a housing with a sealing and fastening system situated below the ceiling.

A mounting of the connecting piece in the false ceiling 3 is shown in FIG. 2. The housing 4 receiving the filter 7 with interpositioning of a seal or gasket 18 possesses a connecting piece or neck 12 which on its extremity is bent outwardly to define an annular collar 13 in which is situated a sealing ring 14 of resilient material. On the underside of the false ceiling 3 is fastened an annular stub or sleeve 15 surrounding the perforation 6; clamping screws 17 are secured to the underside of the false ceiling 3. The connecting piece 12 has a clamping plate 16, engaging under the annular collar 13, which is lifted by tightening the clamping nuts 17 until the sealing ring 14 is in contact under pressure with the lower edge of the annular stub 15 through the intermediary of the deformable sealing strip 14. This ensures a hermetic connection of the housing 4 and thus of the filter cell 7 with the plenum chamber 10 situated above the false ceiling 3 (see FIG. 1), from which the flow of gas or air to be treated passes, without infiltrating air into the room 11 which is to be kept clean, through the connecting piece 12, the housing 4 and the filter cell 7. In the embodiment according to FIG. 2, the installation and replacement of the housing 4 can be performed from the work room 11, i.e. from below.

Figure 3:
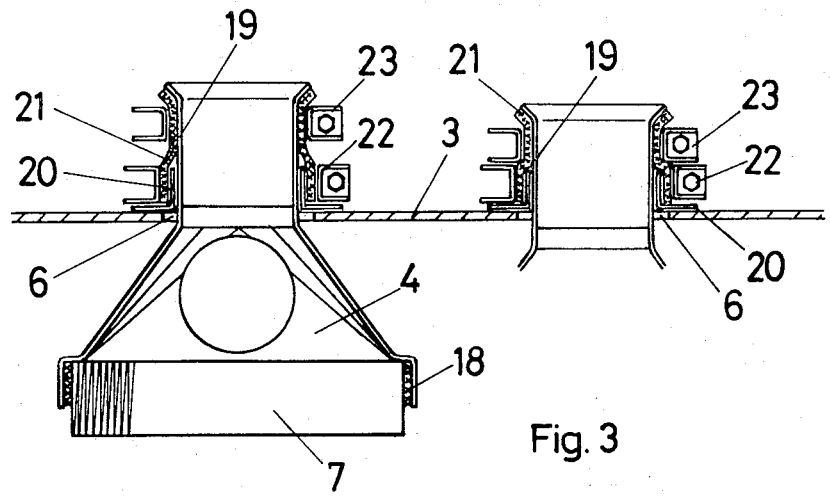
FIG. 3 shows a housing with a sealing and fastening system situated above the ceiling.

FIG. 3 shows a modified embodiment. In this case, the housing 4 carrying the filter cell 7 has a connecting piece or neck 19 which passes through the perforation 6 of the intermediate panel 3 and projects into the plenum chamber 10 thereabove. On the upper side of the intermediate ceiling 3 is fastened a sleeve 20 which carries a deformable sealing cuff or sleeve 21. A bottom clamping ring or clip 22 is provided by means of which the lower extremity of the sealing sleeve 21 is clamped between the clip 22 and the pipe stub or inner sleeve 20. Above the clip 22 I have arranged a second clip 23 which presses the upper extremity of the sealing sleeve against the outer periphery of the connecting piece 19. The clip 23 is pulled down to seat on the lower clip 22 by the weight of the housing 4, so that the housing 4 is held in position. If it becomes necessary to replace the housing 4, the upper clip 23 is removed whereupon the connecting piece 19 with the housing 4 and the filter cell 7 can be pulled out downwardly through the perforation 6 of the false ceiling 3.

Clip 22 embraces a lower portion of cuff 21 to clasp it onto sleeve 20 whereas clip 23 clamps a lower portion of the cuff to neck 19, so that no air can come in directly through the perforation 6.

Figure 4:
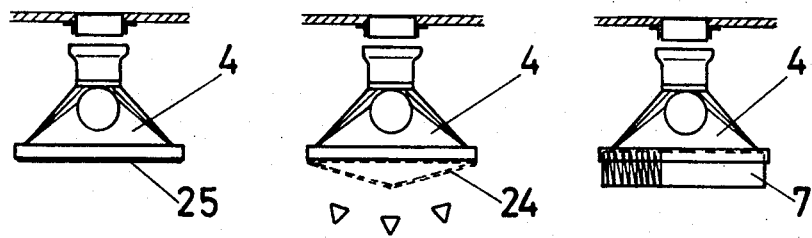
FIG. 4 shows housings equipped with different inserts.

FIG. 4 shows different possibilities in the use of the housing 4 which according to the illustration at the right is equipped with a filter cell 7, according to the illustration in the middle is equipped with a grill insert or anemostat 24 for the purpose of air distribution, and according to the illustration at the left is equipped with a closing shutter 25.

Figure 5:
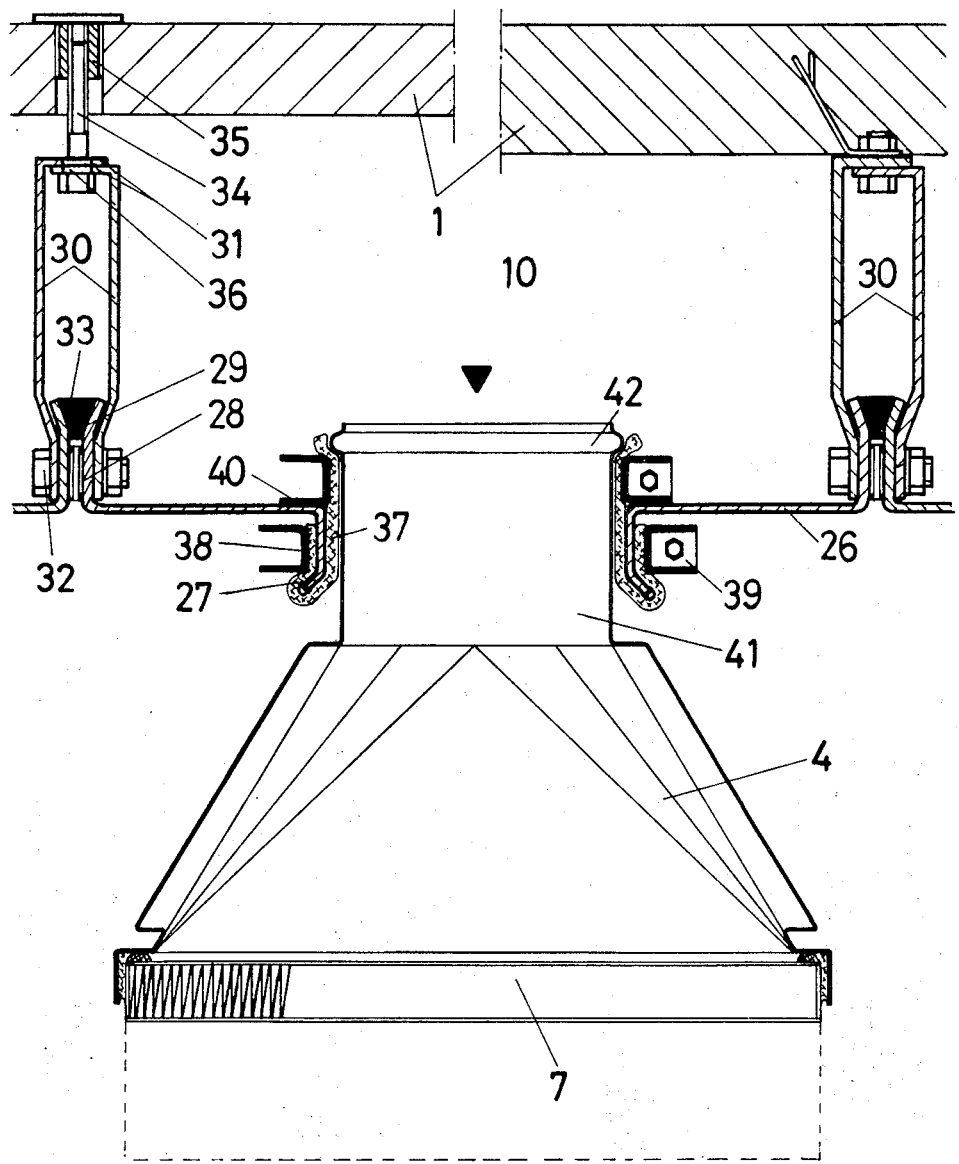
FIG. 5 shows a further embodiment of my improved housing and fastening system and a possible ceiling construction.

In FIG. 5, each filter-cell housing 4 is associated with a supporting unit comprising a carrying plate 26 deformed into a central and downwardly directed annular sleeve 27. In size, the plate 26 corresponds to at least the greatest horizontal cross-sectional area of the filter cell housing 4. An upwardly bent peripheral flange 28 thereof has an inbent edge 29. When assembled, the carrying plates 26 form an intermediate or false ceiling, the individual plates 26 being interconnected by mountings 30 arranged in the ceiling 1 of the room. Each mounting 30 consists of two generally parallel vertical plates whose short horizontal flanges 31 are bent parallel to the ceiling 1 and overlap one another. The lower edges of the fasteners 30 overlap the flanges or rims 28 of two adjacent plates 26 and interconnect these by means of a sealed fastening screw 32. In order that this joint may be sealed in an airtight manner, a jointing compound 33 is cast between the uppermost edges 29 which jointly define a V-shaped channel. As shown at the right-hand side of FIG. 5, the mountings 30 may be attached to the original ceiling 1 of the room. It is advantageous, however, that the mountings 30 be secured to the ceiling 1 in a vertically and transversely displaceable manner, to allow precise alignment of the individual plates 26 with formation of a horizontal intermediate ceiling. To facilitate this, the ceiling 1 has nuts 35 situated in it; countersunk nuts 35 are engageable from below by bolts 34. These bolts and nuts support the overlapping flanges 31 of the mountings 30, so that the individual mountings are vertically adjustable by appropriately setting the screw bolts 34. To afford transverse displaceability of the mountings 30, elongated slots 36 are provided in the overlapping flanges 31. It is possible in this way, irrespective of the configuration of the ceiling 1, to position the individual plates 26 as a horizontal false ceiling in which the individual carrying plates 26 adjoin one another on all sides.

The peripheral web or sleeve 27 of the plate 26 embraces part of a seal or gasket constituted as a deformable sleeve or cuff 37 whose lower extremity 38 is folded back to overlap the outer surface of the sleeve 27 surrounding an intermediate portion of the cuff. A lower clip 39 bears on the inverted extremity 38 of the sleeve 37 and seals off the annular web 27, so that no infiltrating air can issue from the plenum chamber 10 formed between the ceiling 1 and the plates 26; an upper clip 40 presses the sleeve 37 in fluidtight manner against the connecting piece or neck 41 of the housing. The upper clip 40 simultaneously acts as a mounting for the connecting piece 41 whose upper end has an annular outer bead of increased diameter 42 which prevents a downward displacement of the housing 4.

Figure 6:
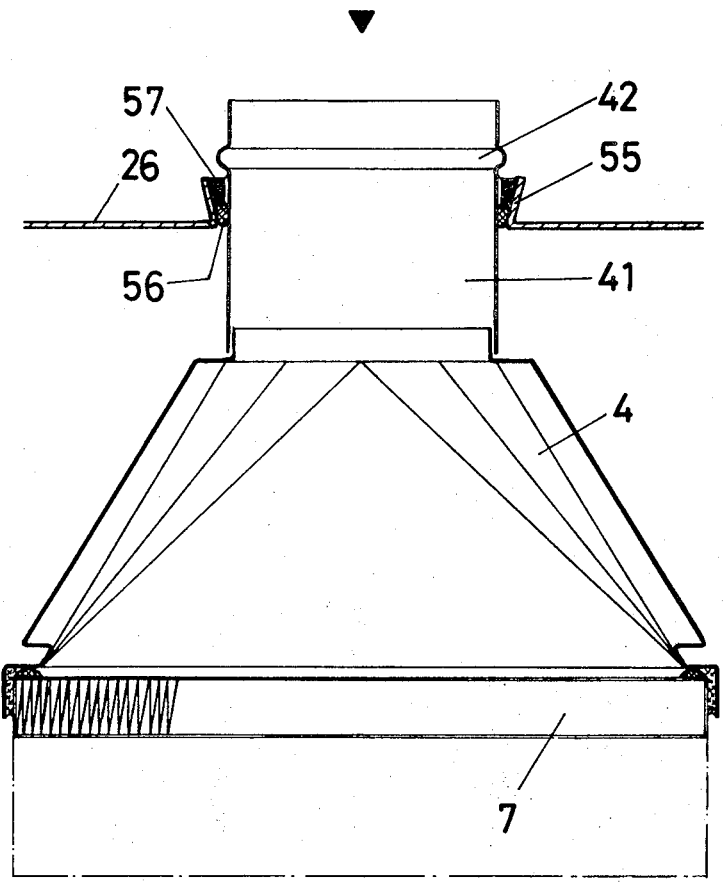
FIG. 6 shows another embodiment of my housing and fastening system.

In FIG. 6 the central perforation of the plate 26 is formed with an integral upwardly directed and conically widening peripheral sleeve 55. The smallest diameter of this sleeve 55 exceeds the outer diameter of the connecting piece or neck 41 of the housing 4 carrying the filter cell 7 so that a resilient deformable sealing ring 56 can be inserted and wedged in between the lower region of the annular sleeve 55 and the connecting piece 41. The funnel-shaped annular clearance situated above the sealing ring 56 is filled with a jointing compound 57 of suitable material which is easily removable. The bead 42 at the end of the connecting piece 41 bears on the mass of jointing compound 57. If it is necessary to replace the housing 4, the jointing compound 57 is removed, the sealing ring 56 is withdrawn, and the housing 4 with the connecting piece 41 is pulled out downwardly through the sleeve 55.

Figure 7:
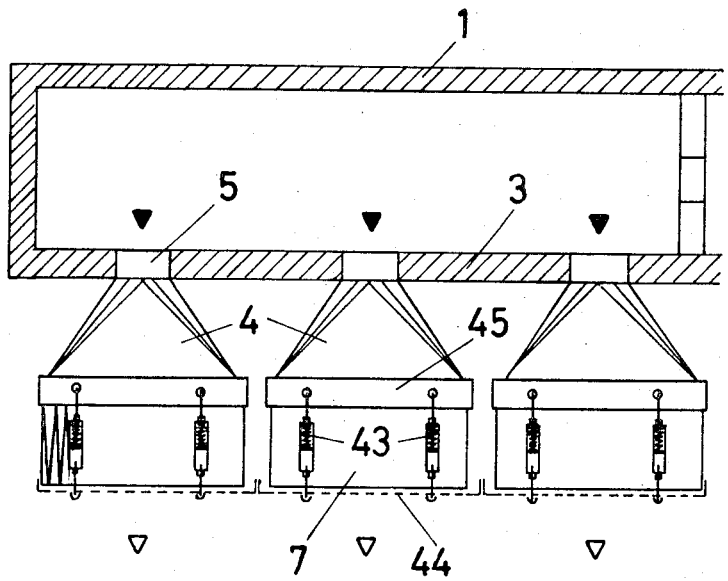
FIG. 7 shows a further feature of the invention.

In the embodiment of FIG. 7, the connecting pieces or necks 5 of the filter-cell housings 4 are firmly received in the false ceiling 3. The filter cells 7 are releasably arranged in their housings 4 by virtue of the fact that they rest on perforated plates 44 whose size corresponds to at least the maximum perimeter of the filter-cell housings 4. The lower edges 45 of the housings 4 are engaged by tie rods or similar elements 43 whose free extremities bear upon the edges of the perforated plates 44. The clamping elements 43 hold the filter cells 7 sealingly in contact with the housings 4, through the perforated plates 44. To replace a filter cell it is only necessary to free the tie rods 43 and to replace the inoperative filter cell by a new one.

Figure 8:
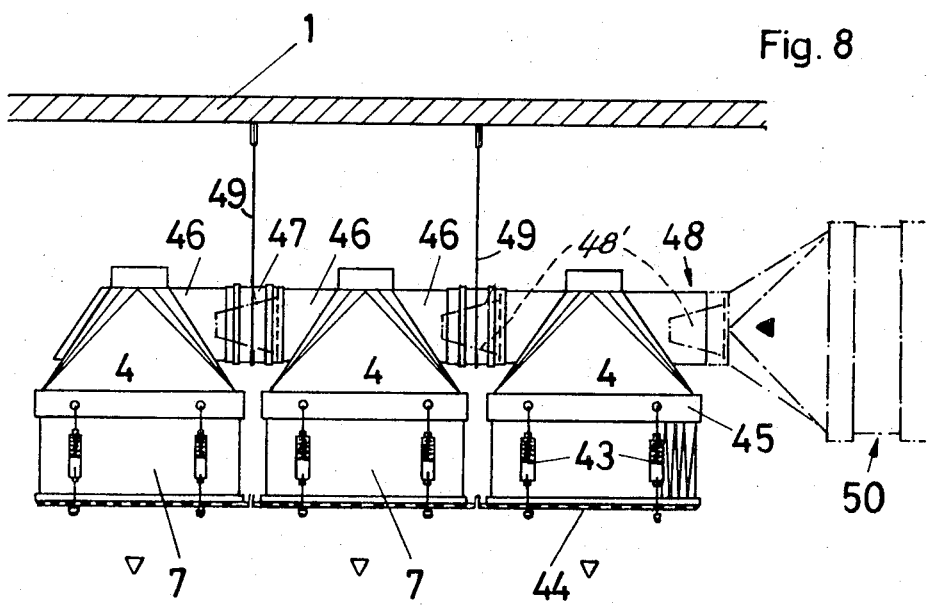
FIG. 8 shows another embodiment of the filter array according to the invention.

In the embodiment according to FIGS. 8 and 9, adjoining filter-cell housings 4 have laterally projecting connecting pieces 46 extending coaxially toward each other from sloping sidewalls thereof. The connecting pieces 46 of mutually adjacent housings 4 of a row of housings are firmly and sealingly interconnected by couplings 47 to form a pipe duct or manifold 48. The pipe duct 48 is fastened to the ceiling 1 of the room by means of suspension elements 49, without the need for a false ceiling. The flow of air or gas to be purified is fed to the individual housings 4 of a row of housings, each coupling 47 between any two adjacent housings being provided with a nozzle insert 48' tapering in the direction of flow which ensures a uniform distribution of the air flow in the pipe duct 48 between the individual cell housings 4 and thus between the individual filter cells 7.

As in the form of embodiment according to FIG. 6, the filter cells are held in sealing contact on their individual housings 4 by means of clamping elements 43 acting through perforated plates 44. If it becomes necessary to replace the filter cells, the same procedure is applied as in the embodiment according to FIG. 6.

An input filter 50, which is shown in FIG. 8 and FIG. 9, is situated in the pipe duct 48 at a location upstream of the first filter-cell housing 4. The input filter 50 consists of two symmetrical filter-cell housings 4 equipped with connecting pieces 51. The cell housings 4 enclose between their larger ends a common filter cell 7, held in sealing contact therewith by means of clamping elements 43 (shown as turn buckles) which overlap the edges of the two housings 4. The connecting piece 51 of one housing 4 is firmly secured to the pipe duct 48 by means of a coupling 52, whereas the connecting piece 51 of the other housing 4 is joined to a duct 54 supplied by a fan, which is not illustrated, by means of bellows 53. If the cell 7 of the input filter 50 is to be replaced, the clamping elements 43 are taken off so that one filter cell housing can be displaced toward the right by utilizing the flexibility of the bellows 53. The filter cell 7 can then be taken out from between the two housings 4 and a new filter cell 7 inserted, whereupon the clamping elements 43 are placed in position again.

The incorporation of an input filter 50, which may for example be constructed as a coarse filter, is advantageous in that it extends the service life of the filter cells 7 whereby their replacement need only be undertaken at longer intervals.

I claim:

1. An assembly for admitting filtered air to a room, comprising:
   an array of juxtaposed units each provided with a downwardly diverging housing terminating in a filter cell at its broader lower end, said units being provided at the narrower upper ends of their housings with interconnected laterally extending ports forming a continuous horizontal manifold;
   inlet means connected to an end of said manifold at a lateral port of one of said housings for supplying same with air to be filtered; and
   perforated plate means underlying said units and fastening means suspending said plate means from said housings, the filter cell of each unit being clamped by said fastening means between the lower housing end and said plate means.

2. An assembly as defined in claim 1 wherein said plate means comprises a set of closely spaced coplanar plates individual to said units.

3. An assembly as defined in claim 1 wherein interconnected ports of adjacent housings are provided with couplings including a frustoconical insert at one port pointing away from said inlet means and entering the adjoining port.

4. An assembly as defined in claim 1 wherein said inlet means comprises a pair of oppositely tapering housings in series confronting each other at their broader ends, and a further filter cell interposed between said confronting ends.

5. An assembly as defined in claim 4 wherein said inlet means further includes releasable link means interconnecting said confronting ends, and a bellows in series with said oppositely tapering housings compressible upon the release of said link means for facilitating extraction of said further filter.

* * * * *